No. 755,669. PATENTED MAR. 29, 1904.
M. R. HUTCHISON.
CURRENT SELECTOR FOR CHARGING SECONDARY BATTERIES.
APPLICATION FILED MAY 5, 1903.
NO MODEL.
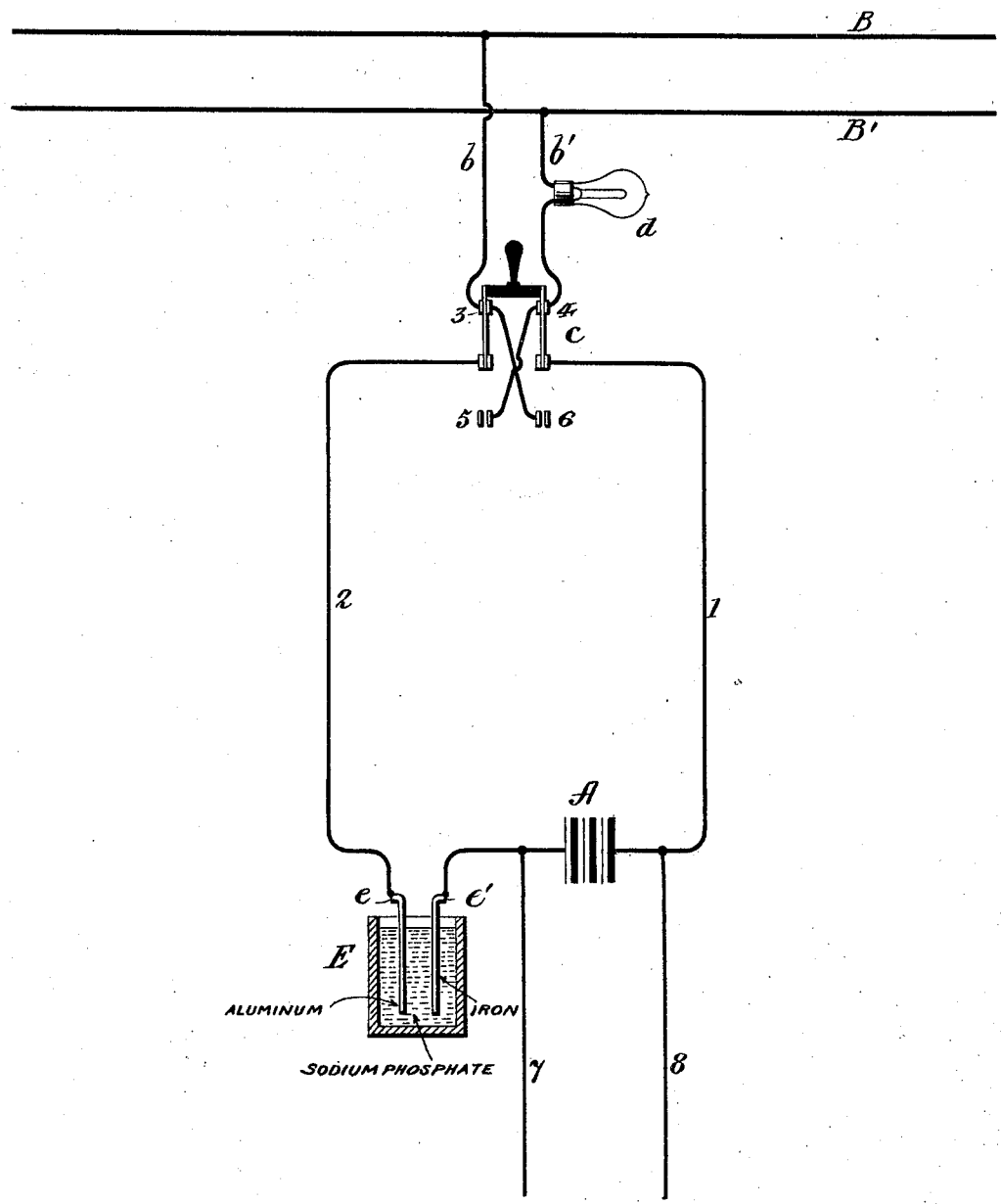

No. 755,669.

Patented March 29, 1904.

UNITED STATES PATENT OFFICE.

MILLER REESE HUTCHISON, OF NEW YORK, N. Y., ASSIGNOR, BY MESNE ASSIGNMENTS, TO HUTCHISON ACOUSTIC COMPANY, A CORPORATION OF NEW YORK.

CURRENT-SELECTOR FOR CHARGING SECONDARY BATTERIES.

SPECIFICATION forming part of Letters Patent No. 755,669, dated March 29, 1904.

Application filed May 5, 1903. Serial No. 155,762. (No model.)

*To all whom it may concern:*

Be it known that I, MILLER REESE HUTCHISON, a citizen of the United States, residing at the city of New York, in the borough of Manhattan and State of New York, have invented certain new and useful Improvements in Current-Selectors for Charging Secondary Batteries, of which the following is a full, clear, and exact description.

This invention is an apparatus designed to be used in connection with the charging of storage batteries as an indicator to show whether the current is flowing in the proper direction for charging and as a protective device to prevent injury to the battery due to the flow of current through it in the wrong direction. The apparatus is also useful for preventing the unintentional discharge of the battery into a line normally used for charging, but accidentally left closed on an occasion when the battery is not undergoing charge.

The invention consists in the combination, with a storage battery, a supply-circuit, and an indicating translating device in the supply-circuit, of an electrolytic cell having a combination of elements and electrolyte capable of preventing the flow of current of one direction or polarity and of permitting the flow of current of the opposite direction or polarity.

The construction and arrangement of this apparatus in circuit will be fully described with reference to the accompanying drawing, in which the figure is a diagrammatic plan of the apparatus and circuits.

The storage battery to be charged is indicated at A.

B and B' are the wires of the main circuit supplying the charging-current. $b$ and $b'$ are branches leading, respectively, from said main wires to a polarity-reversing switch $c$, one of the branches having an incandescent lamp $d$ connected in series with it.

E is an electrolytic cell containing an aluminium electrode $e$ and an iron electrode $e'$ in a solution of sodium phosphate. It is well known in the art that a cell of this character will not permit of the passage of current from the aluminium electrode to the iron electrode, but will admit of the passage of current when it is directed therethrough from the iron electrode to the aluminium electrode. This cell is therefore connected in series with the battery A on a circuit 1 2, leading to the pivotal points of the lever-arms of a reversing-switch $c$. The reversing-switch has two terminals 3 4, connected with the branch wires $b\ b'$, respectively, and two other terminals, 5 6, also connected with said branch wires, but in reversed relation, so that the current sent through wires 1 and 2 from the main wires may be reversed in direction by throwing the switch from one position to the other.

When the battery is to be charged, it is connected in the circuit 1 2, in series with the cell E, in such manner that any current permitted to flow in the circuit by the cell E will be in the proper direction to charge the battery. The switch $c$ is then thrown to one position or the other. If the current is of the correct polarity—viz., if it is flowing from the iron electrode to the aluminum electrode—the lamp $d$ will become incandescent and the operator will know that current is flowing and the battery is charging. If the lamp does not become incandescent, the operator will know that no current is flowing, and he will therefore throw the switch to the opposite position, which will effect the desired result.

It will thus be seen that the cell E is a protective agent for the battery under all conditions. An unexpected change of the polarity of the current on the main circuit will not injure the battery, since the cell will not permit it to pass through the branch circuit. It will also be seen that the cell E prevents waste of current from the battery by unexpected or unintentional discharge. For instance, if the switch at $c$ is closed and the main circuit is closed at any point and no current flowing, the battery cannot discharge into the line, because the polarity of the discharging-current is opposite to that of the charging-current and would not be permitted to flow through the cell E. Whenever possible, therefore, it is desirable to operate with the cell E in circuit with the battery, but in discharging the switch $c$ should be open. The two conductors 7 and 8 may indicate the discharging-circuit.

Having described my invention, I claim—

The combination of a main charging-circuit, a branch circuit leading therefrom and including in series a translating device, a storage battery to be charged and an electrolytic cell capable of preventing flow of current in one direction and permitting it to flow in the opposite direction, substantially as and for the purpose set forth.

In witness whereof I subscribe my signature in presence of two witnesses.

MILLER REESE HUTCHISON.

Witnesses:
E. J. ULMAN,
A. A. DEAN.